(12) United States Patent
Fallon et al.

(10) Patent No.: US 9,167,120 B2
(45) Date of Patent: Oct. 20, 2015

(54) DOCUMENT POLICIES FOR A DOCUMENT PROCESSING UNIT

(75) Inventors: Michael F. Fallon, Tiverton, RI (US); Myles Wilde, Charlestown, MA (US); Matthew J. Adiletta, Bolton, MA (US); Thomas R. Clancy, Sterling, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/991,725

(22) PCT Filed: Dec. 28, 2011

(86) PCT No.: PCT/US2011/067505
§ 371 (c)(1),
(2), (4) Date: Jun. 5, 2013

(87) PCT Pub. No.: WO2013/100943
PCT Pub. Date: Jul. 4, 2013

(65) Prior Publication Data
US 2014/0111834 A1 Apr. 24, 2014

(51) Int. Cl.
*H04N 1/028* (2006.01)
*H04N 1/00* (2006.01)
(Continued)

(52) U.S. Cl.
CPC ............ *H04N 1/028* (2013.01); *G06F 3/1222* (2013.01); *G06F 3/1238* (2013.01); *G06F 3/1285* (2013.01); *G06F 21/60* (2013.01); *H04N 1/0087* (2013.01); *H04N 1/00278* (2013.01); *H04N 1/00843* (2013.01); *H04N 1/00854* (2013.01);
(Continued)

(58) Field of Classification Search
CPC ............ H04N 1/028; H04N 1/00843; H04N 1/00854; H04N 1/0087; H04N 1/00875; H04N 1/32122; H04N 1/00278; H04N 2201/0094; H04N 2201/0082; H04N 2201/3276; G06F 21/60; G06F 3/1222; G06F 3/1238; G06F 3/1285; G06F 17/27; G06F 3/1239
USPC ............ 358/1.1, 3.24, 3.28, 1.13, 1.15, 400, 358/401, 448, 462
See application file for complete search history.

(56) References Cited

U.S. PATENT DOCUMENTS 6,594,351 B1 * 7/2003 Bhogal et al. ............ 379/100.01
7,251,047 B2 * 7/2007 Meade, II .................... 358/1.13
(Continued)

OTHER PUBLICATIONS

"PCT Notification of Transmittal of the International Search Report and the Written Opinion of the International Searching Authority, or the Declaration", dated Aug. 31, 2012, for International Application No. PCT/US2011/067505, 10pgs.
"Notification Concerning Transmittal of International Preliminary Report on Patentability Chapter 1 of the Patent Cooperation Treaty", Jul. 10, 2014, for International Application No. PCT/US2011/067505, 7pgs.

*Primary Examiner* — Thomas D Lee
(74) *Attorney, Agent, or Firm* — Buckley, Maschoff & Talwalkar LLC (57) ABSTRACT

According to some embodiments, a document processing unit may receive information associated with a document to be processed. The document processing unit might comprise, for example, a printer, scanner, copier, facsimile machine, or multi-function device. The document processing unit may then automatically analyze the received information in view of at least one pre-determined document policy. The document processing unit may then automatically determine, based on the analysis, whether to apply a policy action, associated with the pre-determined document policy, to the processing of the document. For example, the document processing unit might prevent a document from printing.

23 Claims, 9 Drawing Sheets

(51) Int. Cl.
*G06F 21/60* (2013.01)
*H04N 1/32* (2006.01)
*G06F 3/12* (2006.01)
*G06F 17/27* (2006.01)

(52) U.S. Cl.
CPC ....... *H04N 1/00875* (2013.01); *H04N 1/32122* (2013.01); *G06F 3/1239* (2013.01); *G06F 17/27* (2013.01); *H04N 2201/0082* (2013.01); *H04N 2201/0094* (2013.01); *H04N 2201/3276* (2013.01)

(56) References Cited

U.S. PATENT DOCUMENTS

| | | | |
|---|---|---|---|
| 7,446,895 B2 * | 11/2008 | Eden et al. | 358/1.16 |
| 8,619,304 B2 * | 12/2013 | Lombardo et al. | 358/1.15 |
| 2003/0179399 A1 | 9/2003 | Matsunoshita | |
| 2009/0310160 A1 | 12/2009 | Kai et al. | |
| 2010/0188684 A1 | 7/2010 | Kumara | |
| 2011/0066852 A1 | 3/2011 | Takeda | |
| 2011/0141513 A1 * | 6/2011 | Nakanowatari | 358/1.15 |

* cited by examiner

| POLICY IDENTIFIER 502 | POLICY RULE 504 | POLICY ACTION 506 | PRIORITY 508 |
|---|---|---|---|
| P1001 | DETECT SOCIAL SECURITY NUMBERS | PREVENT PROCESSING | 1 |
| P1002 | DETECT KEYWORDS FROM BLACKLIST FILE | PREVENT PROCESSING AND ADD ENTRY TO LOG | 2 |
| P1003 | IF USER IS NOT IN HUMAN RESOURCES, THEN DETECT SALARY INFORMATION | WARN USER | 1 |
| P1004 | DETECT CREDIT CARD NUMBERS | INSERT WATERMARK | 3 |

FIG. 9 großen # DOCUMENT POLICIES FOR A DOCUMENT PROCESSING UNIT

BACKGROUND OF THE INVENTION

A document processing unit may facilitate an exchange of information. For example, an employee may use a printer or copier to create multiple copies of a memo or report to be distributed to other employees of the company. As another example, a child might use a scanner to capture a page of a book and then send that captured image to his or her friends as an email attachment.

Note that it may be desirable to limit or otherwise control the distribution of certain types of information. For example, a company might want to prevent employees from printing or copying confidential business information, such as trade secrets or personal information (e.g., employee salaries or customer Social Security numbers). As another example, a parent might want to help a child avoid the creation or copying of certain documents.

In some cases, a business might establish a rule or policy about printing, copying, or otherwise distributing information. For example, a company policy handbook might let employees know that the printing or copying of inappropriate information is not permitted. Even with such an approach, however, employees might forget the policy or mistakenly create documents that violate the policy. Thus, it can be very difficult to monitor and control the processing of documents, especially when a relatively large number of people, documents, and/or document processing units are involved.

DETAILED DESCRIPTION OF EXAMPLE EMBODIMENTS

Figure 1:
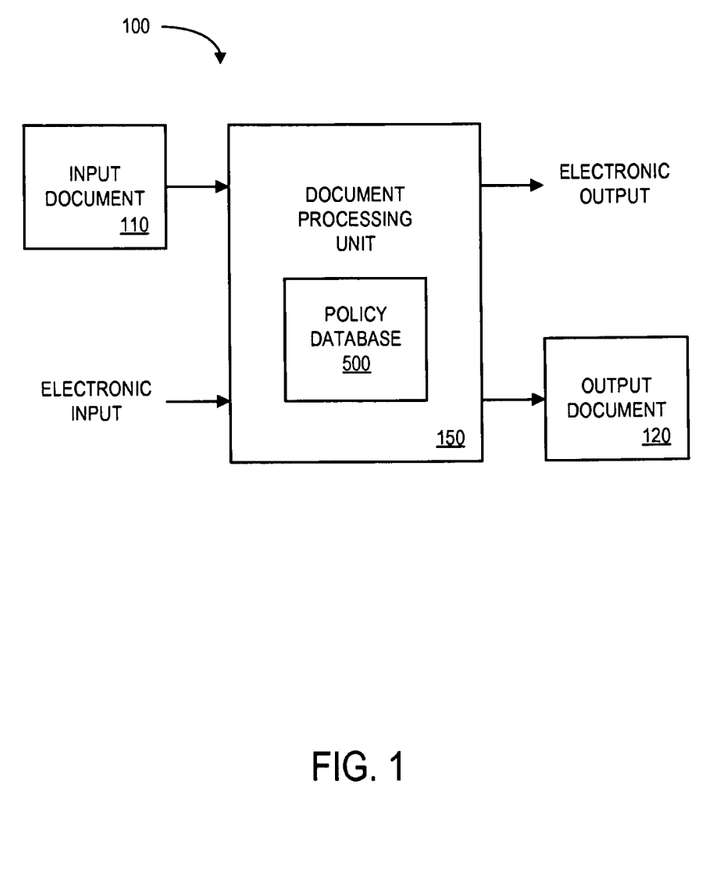
FIG. 1 is a block diagram of a system in accordance with some embodiments.

FIG. 1 is a block diagram of a system 100 that includes a document processing unit 150 in accordance with some embodiments. The document processing unit 150 may facilitate an exchange of information. The document processing unit 150 might comprise a scanner that receives a paper input document 110 and creates an electronic output version (e.g., a bitmap image) of that document 110. As another example, the document processing unit 150 might comprise a printer that receives an electronic input (e.g., from a remote networked computer) and prints a paper output document 120. As still other examples, the document processing unit 150 might comprise a copier (e.g., that receives a paper input document 110 and generates an identical paper output document 120) or a facsimile machine (e.g., that receives the paper input document 110 and transmits a signal via a telephone line to reproduce the document at a remote location).

Note that it may be desirable to limit or otherwise control the distribution of information via the document processing unit 150. For example, a company might want to prevent employees from printing or copying confidential business information, such as trade secrets or personal information (e.g., employee salaries or customer Social Security numbers). As another example, a parent might want to help a child avoid the creation or copying of certain documents via the document processing input 150.

In some cases, a business might establish a rule or policy about printing, copying, or otherwise distributing information. For example, a company policy handbook might let employees know that the printing or copying of inappropriate information is not permitted. Even with such an approach, however, employees might forget the policy or mistakenly create documents that violate the policy. Thus, it can be very difficult to monitor and control the processing of documents, especially when a relatively large number of people, documents, and/or document processing units 150 are involved.

Accordingly, a method and mechanism to efficiently, accurately, and automatically help ensure compliance with these types of document policies may be provided in accordance with some embodiments described herein. In particular, the document processing unit 150 of FIG. 1 includes a policy database 500 that may store one or more policy rules associated with the copying and/or creation of input documents 110 and output documents 120. For example, the policy database 500 might store information indicating that all documents printed by the document processing unit 150 should be searched to determine if the document includes the phrase "Social Security number." When the phrase is detected, the document processing unit 150 may inform the user who is printing the document that the phrase has been detected and ask if he or she wants the document to be printed. Only after the user confirms that he or she still wants to print the document will the document processing 150 unit print the paper output document 120.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the document processing unit 150, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

All systems and processes discussed herein may be embodied in program code stored on one or more non-transitory computer-readable media. Such media may include, for example, a floppy disk, a CD-ROM, a DVD-ROM, magnetic tape, solid state Random Access Memory ("RAM") or Read Only Memory ("ROM") storage units. Embodiments are therefore not limited to any specific combination of hardware and software.

Figure 2:
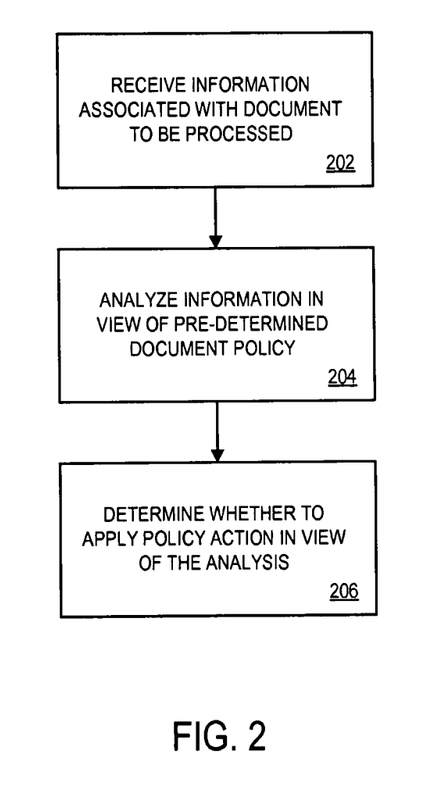
FIG. 2 is a flow diagram illustrating a method in accordance with some embodiments.

FIG. 2 is a flow diagram of a process 200 that might be associated with the document processing unit 150 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 202, a "document processing unit" may receive information associated with a document to be processed. As used herein, the phrase "document processing unit" might refer to, for example, a printer, a scanner, a copier, a facsimile machine, and/or a multi-function document processing unit (e.g., that acts as both a printer and a copier).

At 204, the document processing unit may "automatically" analyze the received information in view of at least one pre-determined "document policy." As used herein, an action may be "automatic" if it requires little or no human intervention. Moreover, as used herein the phrase "document policy" may refer to, for example, any rule that may be applied to the processing of documents, such as a rule associated with the detection of confidential information. For example, a business might want to monitor confidential information or a government might want to monitor secret information. As still another example of confidential information, an educational institution might want to monitor examination papers and/or test results. Note that any document policy described herein might be associated with a keywords, a text search, a pattern search (e.g., looking for a sequence of numbers arranged "XXX-XX-XXXX" where X is a numeric character to detect potential Social Security numbers), an Optical Character Recognition ("OCR") analysis, and/or an image analysis (e.g., looking for images of a soon to be released product).

According to some embodiments, a document policy might be associated with detecting private personal information (e.g., a list of customer home addresses) or otherwise inappropriate information (e.g., explicit material). Note that instead of looking for and detecting certain types of material, a document policy might be associated with detecting missing information. For example, a document policy might note that a document is missing copyright information (e.g., "Materials Copyrighted 2015©") or an indication that a word or phrase is trademarked (e.g., with a "®" or "™" symbol).

At 206, the document processing unit may automatically determine, based on the analysis of 204, whether or not to apply a policy "action," associated with the pre-determined document policy, to the processing of the document. As used herein the phrase "policy action" may refer to, for example, prevention of the document processing. For example, a printer may simply decide that a particular document will not be printed. According to other embodiments, a policy action may refer to a recordation of the processing of the document in a log entry. For example, if a document included the words "TOP SECRET" near the top margin, a copier might log an indication of where and when the document was copied along with a picture of the person making the copier (e.g., via a camera embedded within the copy machine).

Figure 3:
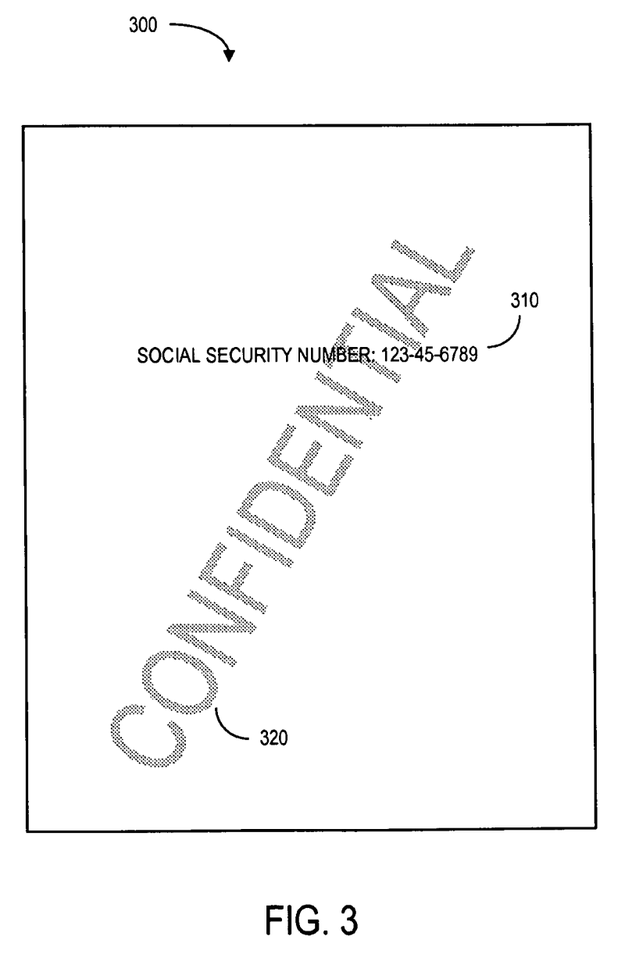
FIG. 3 illustrates a document according to some embodiments.

As other examples, the policy action might be associated with an automatic generation of a notification or alert. For example, an email might automatically be sent to an employee's supervisor if it was automatically detected that he or she was faxing a document in violation of a company policy. As still another example, a policy action might be associated with an insertion of a watermark into the document. For example, FIG. 3 illustrates a document 300 according to some embodiments. In this example, an OCR process might analyze the document and detect that it potentially contains a Social Security number 310. In this case, a policy action might automatically insert a "CONFIDENTIAL" watermark 320 on the document.

According to some embodiments, the application of a document policy may be based at least in part on a user identifier. For example, a user might enter his or her employee identifier into a copier. In this case, different policies might be applied to different employees. For example, a supervisor might be allowed to copy certain materials that other employees are not allowed to copy. Note that the user identifier might be based on, for example, a communication between a document processing unit and a user device, such as a user's smartphone, Radio Frequency IDentifier ("RFID") keychain, or employee card with a magnetic strip. According to other embodiments, biometric information (e.g., a fingerprint) or facial recognition process may be used to determine a user identifier. Note that application of a document policy may be based on a user's title or role in a company. For example, a person working in human resources department might be allowed to print a report including salaries that other employees are not allowed to print.

According to some embodiments, the application of a document policy may be based at least in part on a processing function type. For example, a policy might indicate that a certain type of document is allowed to be copied but is not allowed to be sent via facsimile.

Note that in the example of FIG. 1, the pre-determined document policy is retrieved from the policy database 500 stored local to the document processing unit 150. In this case, the policy database 500 might be installed by an administrator and/or may be automatically updated when needed or on a periodic basis (e.g., each night).

Figure 4:
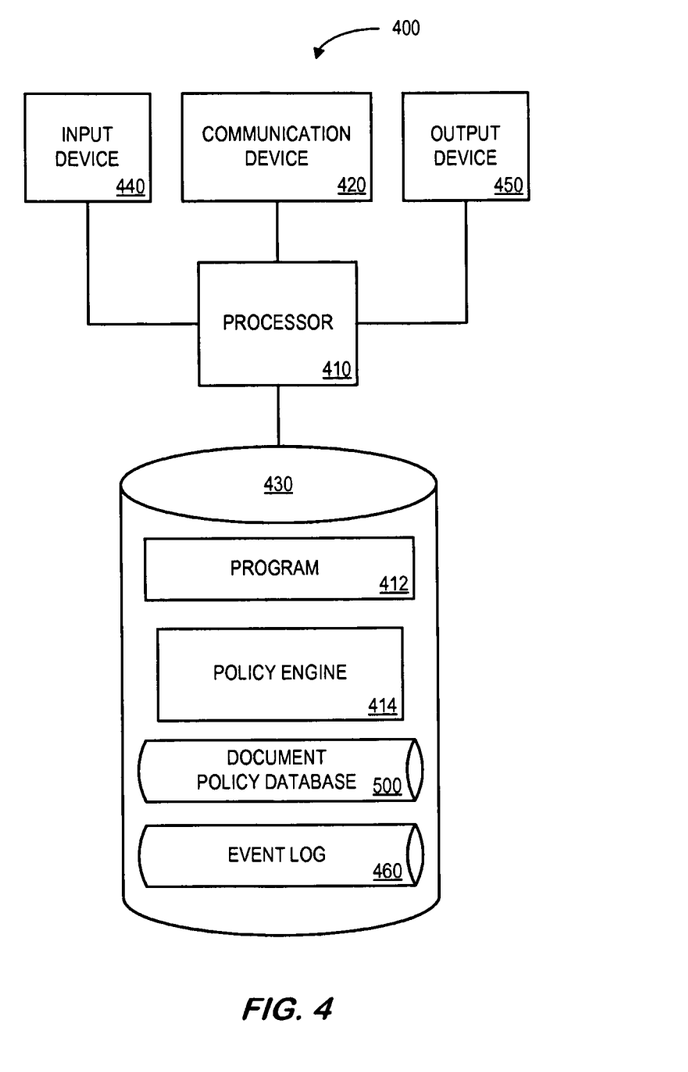
FIG. 4 is a block diagram of document processing unit according to some embodiments.

FIG. 4 is a block diagram overview of a document processing system 400 according to some embodiments. The document processing system 400 may be, for example, associated with the system 100 described with respect to FIG. 1, respectively. The document processing system 400 comprises a processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more remote computers, servers, or facsimile machines. The document processing system 400 further includes an input device 440 (e.g., a motion sensor, touchscreen, and/or keyboard to receive information from a user who is processing a document) and an output device 450 (e.g., a computer monitor and/or printer to provide information to a user).

The processor 410 communicates with a storage device 430. The storage device 430 may comprise any appropriate information storage device, including combinations of magnetic storage devices (e.g., a hard disk drive), optical storage devices, and/or semiconductor memory devices. The storage device 430 stores a program 412 and/or policy engine 414 for controlling the processor 410. The processor 410 performs instructions of the programs 412, 414, and thereby operates in accordance with any of the embodiments described herein. For example, the processor 410 may receive information associated with a document to be processed. The processor 410 may then automatically analyze the received information in view of at least one pre-determined document policy. The processor 410 may then automatically determine, based on the analysis, whether to apply a policy action, associated with the pre-determined document policy, to the processing of the document. For example, the processor 410 might prevent a document from printing or being copied.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the document processing system 400 from another device; or (ii) a software application or module within the document processing system 400 from another software application, module, or any other source.

In some embodiments (such as shown in FIG. 4), the storage device 430 stores a document policy database 500 (described with respect to FIG. 5) and an event log 460. An example of a database that may be used in connection with the document processing system 400 will now be described in detail with respect to FIG. 5. Note that the database described herein is only one example, and additional and/or different information may be stored therein. Moreover, various databases might be split or combined in accordance with any of the embodiments described herein.

Figure 5:
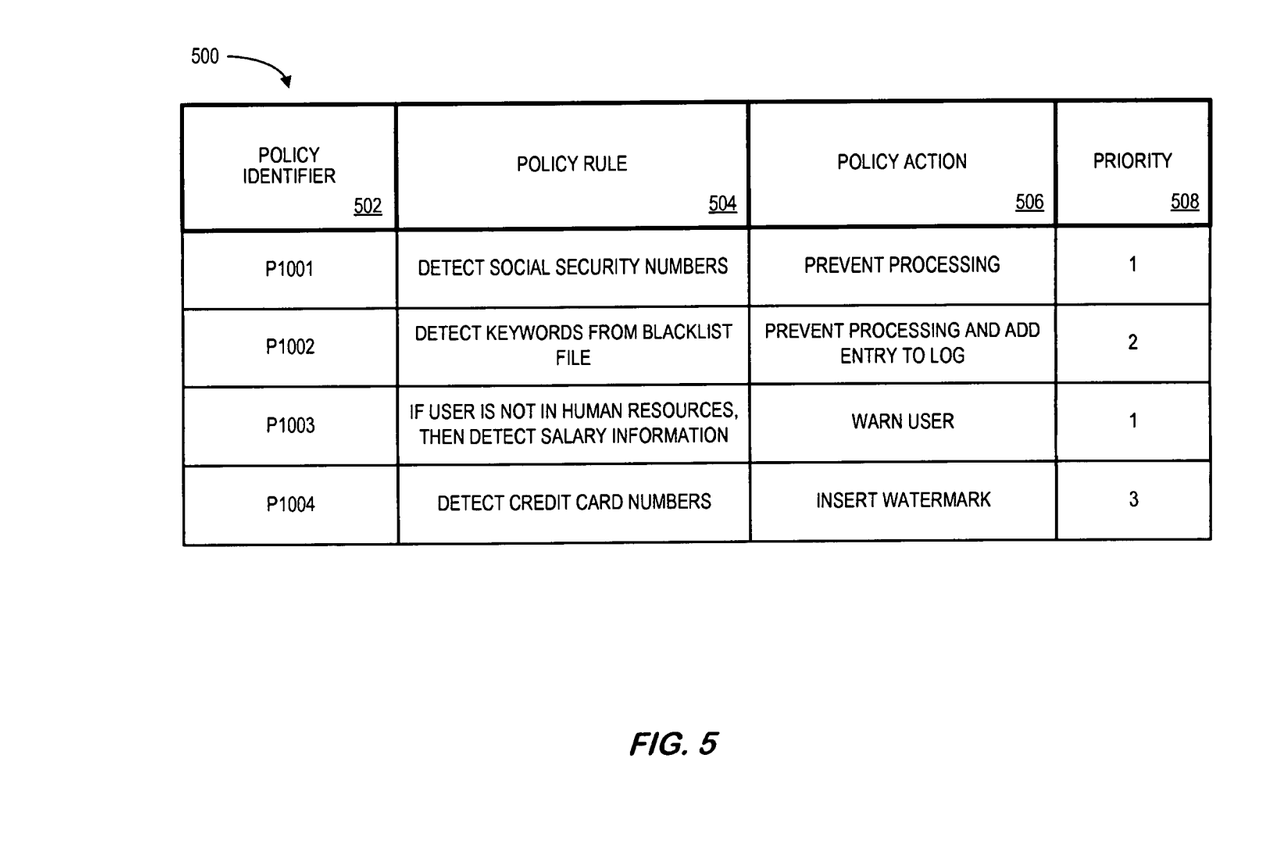
FIG. 5 is a portion of a tabular representation of a document policy database in accordance with some embodiments.

Referring to FIG. 5, a table is shown that represents the document policy database 500 that may be stored at the document processing system 400 according to some embodiments. The table may include, for example, entries identifying policies that may be applied to document processing. The table may also define fields 502, 504, 506, 508 for each of the entries. The fields 502, 504, 506, 508 may, according to some embodiments, specify: a policy identifier 502, a policy rule 504, a policy action 506, and a priority 508. The information in the policy database 500 may be created and updated, for example, based on data received from an administrator.

The policy identifier 502 may be, for example, a unique alphanumeric code identifying a policy that is to be applied to a document being processed. The policy rule 504 may define the ways in which a document is to be analyzed. For example, the policy rule 504 might indicate that Social Security numbers should be detected (e.g., by looking for certain patterns or by matching values within another database) or that keywords from a "blacklist" file should be detected (e.g., a dictionary of inappropriate terms). The policy action 506 may indicate one or more tasks that will be executed when the policy rule 504 is satisfied. For example, the policy action 506 might indicate that a function should not be performed ("Prevent Processing") or that a watermark should be inserted. The priority 508 might help a document processing unit determine which policy action 506 should be performed when multiple policy rules 504 are satisfied simultaneously.

Figure 6:
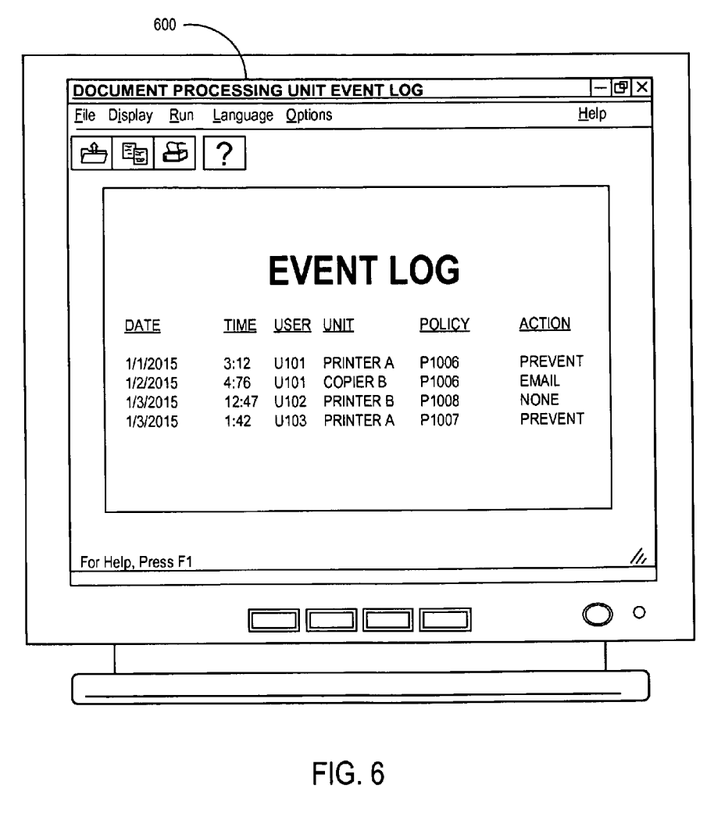
FIG. 6 is an example of a document processing unit event log display according to some embodiments.

Note that the policy action 506 associated with policy identifier 502 "P1002" indicates that an entry to a log file should be added when the policy rule 504 is satisfied. FIG. 6 illustrates a document processing unit event log display 600 in accordance with some embodiments. The display 600 may, for example, comprise a sequential list of user attempts to process a document in violation of one or more document policies. For each attempt, the display 600 might indicate, for example, a date, time, user identifier, document processing unit identifier, violated policy identifier, and what action, if any, was taken.

Figure 7:
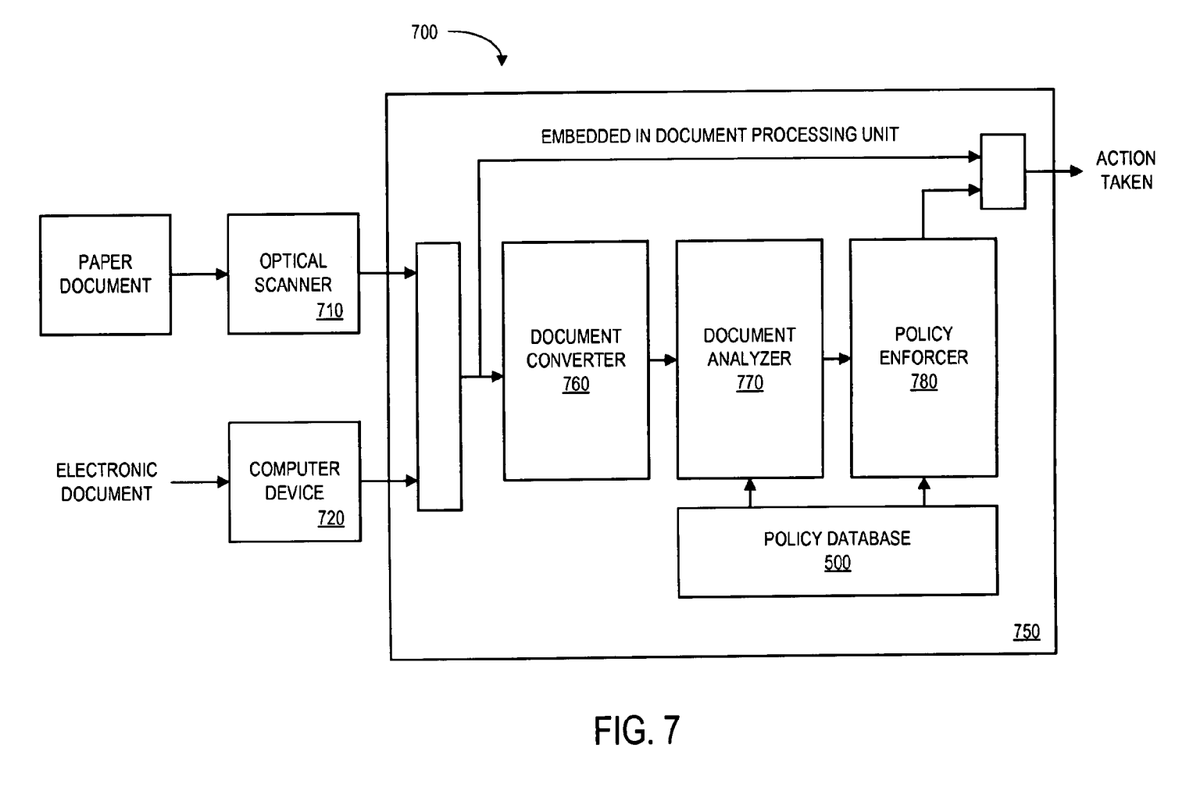
FIG. 7 is a block diagram of a document processing system according to some embodiments.

Note that embodiments described herein might be implemented using any number of different architectures. FIG. 7 is a block diagram of a document processing system 700 according to some embodiments. In particular, the system 700 may enable a document processing unit 750, such as a printer, copier, fax machine, scanner, and/or multi-function device analyze documents and enforce policies based on content. The document processing unit 750 may, for example, receive a paper document via an optical scanner 710 and/or receive an electronic document via a computer device 720 (e.g., a personal computer or server).

According to some embodiments, the document processing unit 750 includes a document format converter 760. Note that paper documents might be input to the document processing unit 750 via the optical scanner 110, and electronic documents may be sent to the document processing unit 750 via a computer device 720, such as computer network. The input format of these documents may not be consistent with the format required by various components of the document processing system 750. As a result, the document format converter 760 may convert an input document format into a format that is consumable by the components of the document processing system 750.

The document processing unit 750 may also include a policy database 500 according to some embodiments. The policy database 500 may be configured and maintained by a system administrator and contain a set of rules, such as rules associated with a presence or lack of presence of particular content. For example, a rule might detect the presence of the word "Confidential" in a document or ensure that a document is labeled with a classification "level 3." As another example, a rule might detect the presence of Social Security numbers in a document. The policy database 500 may further define actions to take when rule violations are detected. For example, the actions might be associated with not printing a document, inserting a watermark into a document, logging an event, and/or sending a notification about the event to a system administrator. The policy database 500 may also include a priority level to be used when multiple rules are violated.

The document processing unit 750 may also include a document analyzer 770 according to some embodiments. The inputs to the document analyzer 770 may be the policy rules as well as the document being processed. The document analyzer 770 may then evaluate each rule in the context of the current document and output a result to a policy enforcer 780. According to some embodiments, there are two classes of analysis that may be processed by the document analyzer 770: (i) a text-based analysis, and (ii) an image based analysis. The text based analysis may employ techniques such as OCR algorithms and intelligent character recognition (e.g., to detect handwriting). The image based analysis might, for example, search for specified images in the document.

According to some embodiments, the document processing unit 750 may also include the policy enforcer 780. The inputs to the policy enforcer 780 may be the output of the document analyzer 770 and the action list and priority levels from the policy database 500. The policy enforcer 780 may be responsible for deciding one or more final actions taken by the system 700 (such as to print, fax, apply watermark, etc). The policy enforcer 780 may make this decision based on the results generated by the document analyzer 770 and the priority of each rule. That is, a plurality of pre-determined document policies are each associated with a policy priority, and actions actually performed by the document processing system 750 may be further based on those policy priorities.

Consider, for example, a situation where the document analyzer 770 detects two events that each have an associated action required by the policy enforcer 780. The first event has an associated low priority action of inserting a watermark reading "Confidential and Printed by User X." The second event has an associated high priority action of deleting the document and immediately notifying a system administrator via e-mail. In this case, the policy enforcer 780 may decide to not enforce the actions associated with the first event (and only enforce the actions associated with the second event).

Figure 8:
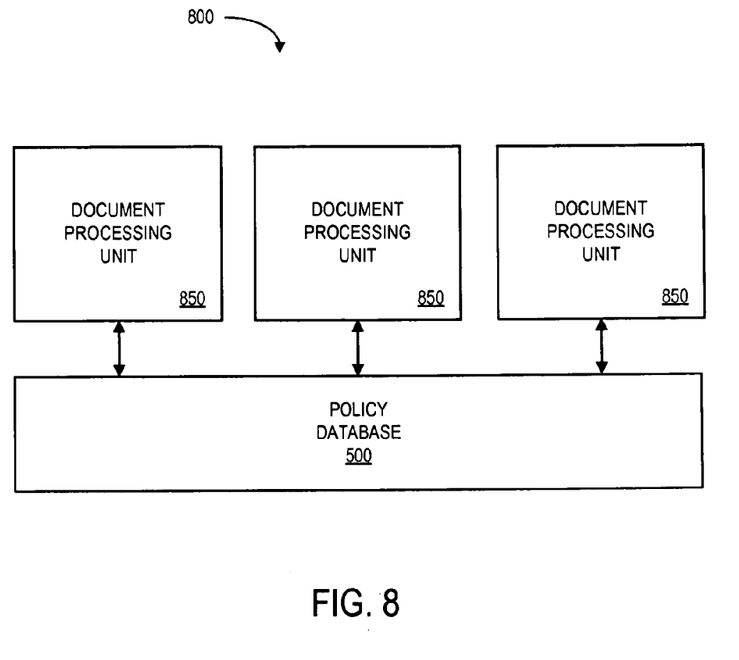
FIG. 8 illustrates a network in accordance with some embodiments.

Note that in the example of FIG. 1, the pre-determined document policy is retrieved from the policy database 500 stored local to the document processing unit 150. According to some embodiments, a pre-determined document policy is received from a policy database stored remote from the document processing unit, and the policy database is accessed by a plurality of document processing units. FIG. 8 illustrates a network 800 in accordance with some embodiments. The network includes a single policy database 500 accessed by multiple document processing units 850. In this way, only a single entry may need to be update to change a document policy. Moreover, consistency between the document processing units 850 may be insured. According to this embodiment, each document processing unit 850 may access the policy database 500 as needed (e.g., using a request-response model or a nightly download of policies).

Figure 9:
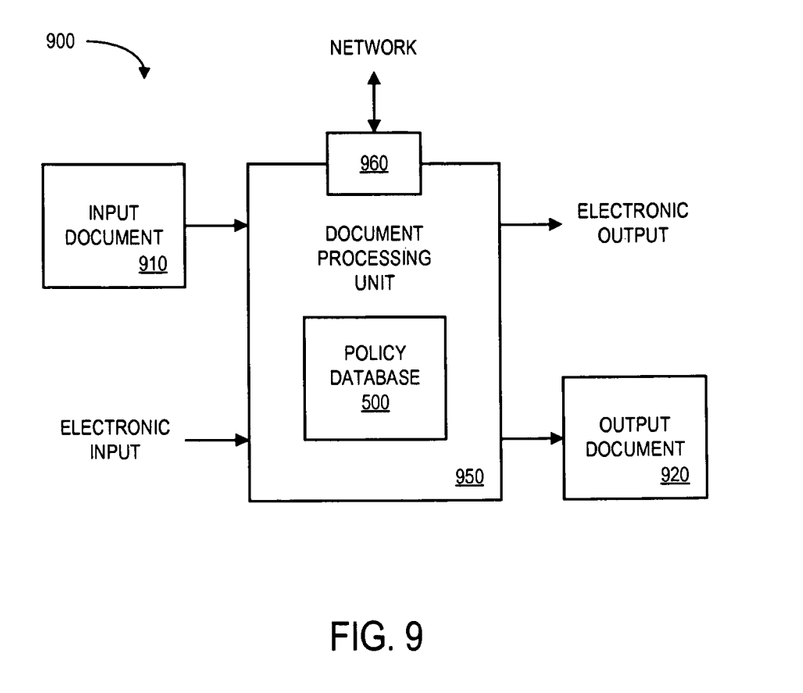
FIG. 9 is a block diagram of a system according to some embodiments.

FIG. 9 is a block diagram of a system 900 according to some embodiments. The system includes a document processing unit 950 with a policy database 500 (e.g., storing at least one pre-determined document policy and associated policy action). The document processing unit 950 may receive input documents 910 and/or create output documents 920 as appropriate. Moreover, the document processing unit 950 may: (i) receive information associated with a document to be processed, (ii) analyze the received information in view of at least one pre-determined document policy in the policy database 500, and (iii) determine, based on this analysis, whether to apply the policy action associated with the pre-determined document policy to the processing of the document. According to some embodiments, the document processing unit 950 further includes a network interface component 960 and may exchange data associated with the document to be processed via the network interface component 960.

Accordingly, a method and mechanism to efficiently, accurately, and automatically help ensure compliance with document policies may be provided in accordance with some embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of document policies, note that embodiments may be associated with other types of policies. For example, a document policy might be associated with a company's newly developed products, competitors, and/or customers. Moreover, while embodiments have been illustrated using particular ways of applying policies to documents, note that embodiments might be associated with audio and/or video information (e.g., displayed on a monitor, captured via a web video camera, and/or spoken over a telephone).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method, comprising:
   receiving, at a document processing unit that provides a first function type and a second function type, information associated with a document to be processed;
   automatically analyzing, by the document processing unit, the received information in view of at least one pre-determined document policy and on an identification of a first user to detect missing information associated with the document; and
   automatically determining, by the document processing unit, based on said analysis and on the identification of the first user, to apply a policy action associated with the pre-determined document policy to the processing of the document, the policy action comprising an insertion into the document, the insertion based on the missing information and, the policy action indicating the first function type and not the second function type.

2. The method of claim 1, wherein the missing information comprises a copyright notice and the insertion comprises a © symbol.

3. The method of claim 1, wherein the missing information comprises an indication that a word or phrase is trademarked and the insertion comprises a ® symbol or a ™ symbol.

4. The method of claim 1, wherein the missing information comprises a watermark and the insertion comprises the watermark.

5. The method of claim 1, further comprising:
   automatically analyzing, by the document processing unit, the received information in view of the at least one pre-determined document policy and on an identification of a second user; and
   automatically determining, by the document processing unit, based on said analysis and on the identification of the second user, to apply a policy action associated with the pre-determined document policy to the processing of the document, the policy action indicating the second function type and not the first function type.

6. The method of claim 1, wherein said analysis is associated with at least one of: (i) keywords, (ii) a text search, (iii) a pattern search, (iv) an optical character recognition analysis, (v) or an image analysis.

7. The method of claim 1, wherein a plurality of pre-determined document policies are each associated with a policy priority, and said automatic determination is further based on the policy priorities.

8. The method of claim 1, wherein the pre-determined document policy is retrieved from a policy database stored local to the document processing unit.

9. The method of claim 1, wherein the pre-determined document policy is received from a policy database stored remote from the document processing unit, wherein the policy database is accessed by a plurality of document processing units.

10. A non-transitory computer-readable storage medium having stored thereon instructions that when executed by a machine result in the following:
    receiving, at a document processing unit that provides a first function type and a second function type, information associated with a document to be processed to detect missing information associated with the document;

automatically analyzing, by the document processing unit, the received information in view of at least one pre-determined document policy and on an identification of a first user; and automatically determining, by the document processing unit, based on said analysis and on the identification of the first user, to apply a policy action associated with the pre-determined document policy to the processing of the document, the policy action comprising an insertion into the document, the insertion based on the missing information and, the policy action indicating the first function type and not the second function type.

11. The medium of claim 10, wherein the document processing unit comprises at least two of the following functions: (i) a printer, (ii) a scanner, (iii) a copier, (iv) a facsimile machine, or (v) a multi-function document processing unit.

12. The medium of claim 10, wherein the pre-determined document policy comprises a rule associated with at least one of: (i) detecting confidential information, (ii) detecting private personal information, (iii) detecting inappropriate information, or (iv) detecting missing information.

13. The medium of claim 10, wherein the policy action is further associated with at least one of: (i) prevention of the document processing, (ii) recordation of the processing of the document in a log entry, (iii) automatic generation of a notification associated with the document processing, or (iv) insertion of a watermark into the document.

14. The medium of claim 10, further comprising:
automatically analyzing, by the document processing unit, the received information in view of the at least one pre-determined document policy and on an identification of a second user; and automatically determining, by the document processing unit, based on said analysis and on the identification of the second user, to apply a policy action associated with the pre-determined document policy to the processing of the document, the policy action indicating the second function type and not the first function type.

15. The medium of claim 10, wherein said analysis is associated with at least two of the following functions: (i) keywords, (ii) a text search, (iii) a pattern search, (iv) an optical character recognition analysis, (v) or an image analysis.

16. An apparatus, comprising:
a policy database storing a pre-determined document policy and associated policy action; and
a document processing unit that provides a first function type and a second function type, coupled to the policy database, to: (i) receive information associated with a document to be processed, (ii) analyze the received information in view of at least one pre-determined document policy in the policy database and on an identification of a first user to detect missing information associated with the document, and (iii) automatically determine, by the document processing unit, based on said analysis and on the identification of the first user, to apply a policy action associated with the pre-determined document policy to the processing of the document, the policy action comprising an insertion into the document, the insertion based on the missing information and, the policy action indicating the first function type and not the second function type.

17. The apparatus of claim 16, wherein the document processing unit comprises at least one of: (i) a printer, (ii) a scanner, (iii) a copier, (iv) a facsimile machine, or (v) a multi-function document processing unit.

18. The apparatus of claim 16, wherein the pre-determined document policy comprises a rule associated with at least one of: (i) detecting confidential information, (ii) detecting private personal information, (iii) detecting inappropriate information, or (iv) detecting missing information.

19. The apparatus of claim 16, wherein the policy action is further associated with at least one of: (i) prevention of the document processing, (ii) recordation of the processing of the document in a log entry, (iii) automatic generation of a notification associated with the document processing, or (iv) insertion of a watermark into the document.

20. A system, comprising:
a network interface component;
a policy database storing a pre-determined document policy and associated policy action; and
a document processing unit that provides a first function type and a second function type, coupled to the network interface component and policy database, to: (i) receive information associated with a document to be processed, (ii) analyze the received information in view of at least one pre-determined document policy in the policy database and on an identification of a first user to detect missing information associated with the document, and (iii) automatically determining, by the document processing unit, based on said analysis and on the identification of the first user, to apply a policy action associated with the pre-determined document policy to the processing of the document, the policy action comprising an insertion into the document, the insertion related to the missing information and, the policy action indicating the first function type and not the second function type, wherein the document processing unit is further to exchange data associated with the document to be processed via the network interface component.

21. The system of claim 20, wherein the document processing unit comprises at least two of the following functions: (i) a printer, (ii) a scanner, (iii) a copier, (iv) a facsimile machine, or (v) a multi-function document processing unit.

22. The system of claim 20, wherein the pre-determined document policy comprises a rule associated with at least one of: (i) detecting confidential information, (ii) detecting private personal information, (iii) detecting inappropriate information, or (iv) detecting missing information.

23. The system of claim 20, wherein the policy action is further associated with at least one of: (i) prevention of the document processing, (ii) recordation of the processing of the document in a log entry, or (iii) automatic generation of a notification associated with the document processing.

* * * * *